United States Patent [19]

Thompson

[11] Patent Number: 4,507,019

[45] Date of Patent: Mar. 26, 1985

[54] METHOD AND APPARATUS FOR REPLACING BURIED PIPE

[75] Inventor: Alan E. Thompson, Kilgore, Tex.

[73] Assignee: Expand-A-Line, Incorporated, Pasadena, Tex.

[21] Appl. No.: 468,137

[22] Filed: Feb. 22, 1983

[51] Int. Cl.³ .............................................. F16L 1/00
[52] U.S. Cl. ..................... 405/154; 138/97; 166/55.2; 166/55.3; 175/22; 405/184
[58] Field of Search ................ 405/184, 156; 175/22, 175/23, 53; 166/55, 55.2, 55.3; 138/97, 98; 72/370, 367

[56] References Cited

U.S. PATENT DOCUMENTS

| | | | |
|---|---|---|---|
| 2,229,912 | 1/1941 | Baily | 175/22 X |
| 2,823,898 | 2/1958 | Bankston | 175/22 |
| 3,039,530 | 6/1962 | Condra | 166/55 |
| 3,181,302 | 4/1965 | Lindsay | 405/156 |
| 3,602,263 | 8/1971 | Brenner | 138/97 |
| 3,730,283 | 5/1973 | Kostylev et al. | 175/53 |
| 3,805,899 | 4/1974 | Hicks et al. | 175/53 X |
| 4,176,716 | 12/1979 | Bielaczek | 175/22 |
| 4,249,620 | 2/1981 | Schmidt | 405/184 |

FOREIGN PATENT DOCUMENTS 585684 10/1959 Canada ................... 166/55
0094694 11/1983 European Pat. Off. ..
429584 5/1926 Fed. Rep. of Germany ........ 72/370

OTHER PUBLICATIONS

Pipe Insertion Machine pp. 35, 37, 39-41, Jul. 1984, Pipeline & Gas Journal.

Primary Examiner—Dennis L. Taylor
Attorney, Agent, or Firm—Gunn, Lee & Jackson

[57] ABSTRACT

A pipeline replacement system incorporating an expansion and line replacement mandrel and having a power system for imparting linear movement and rotation to the mandrel. Within the scope of the invention, the mandrel may be pushed or pulled or both pushed and pulled through an existing buried pipeline by the power system while being rotated by the power system. The mechanism, in a single pass, breaks up the existing pipeline, forces the broken fragments of the pipeline into the surrounding earth and positions a replacement pipe of the same dimension or larger dimension in place of the existing pipeline. A swivel system allows the replacement pipe to be moved linearly into the expanded passage behind the mandrel without rotation. The power system includes a mechanism or mechanisms for applying pushing, rotational and pulling forces to the mandrel.

19 Claims, 10 Drawing Figures

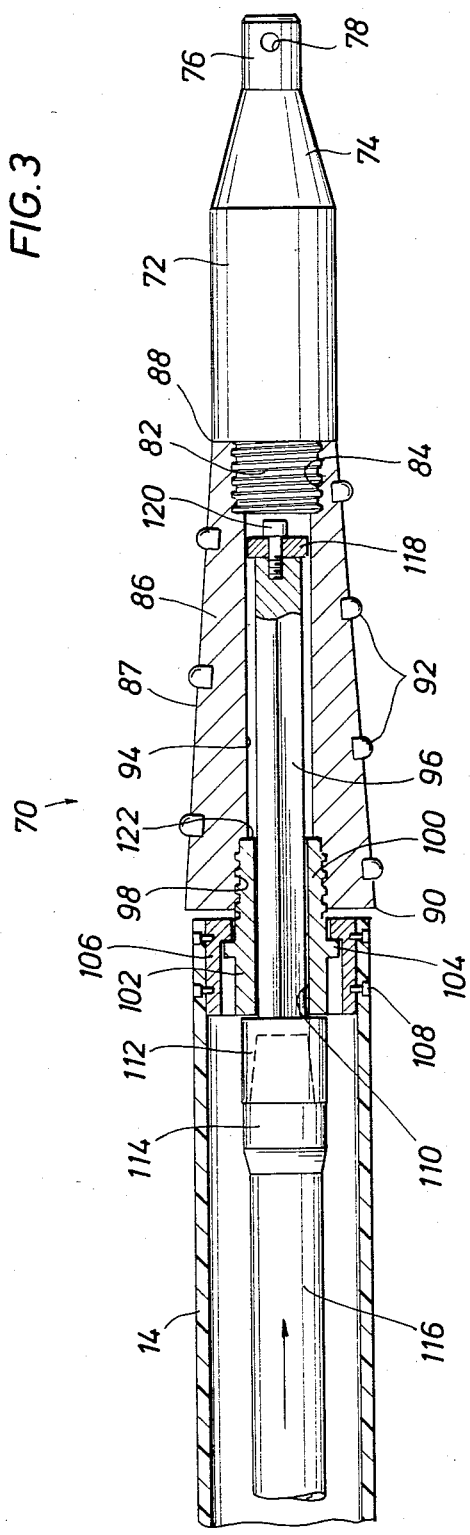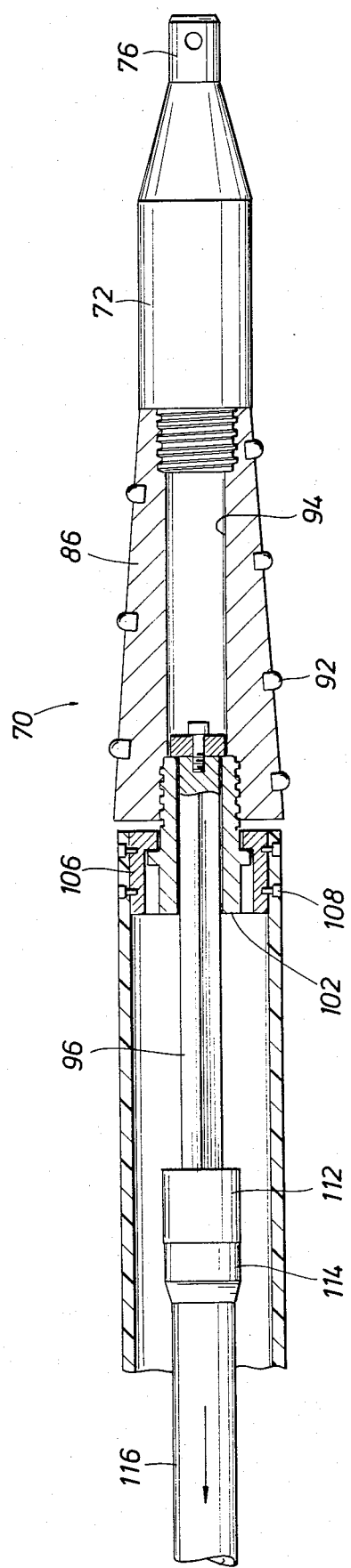

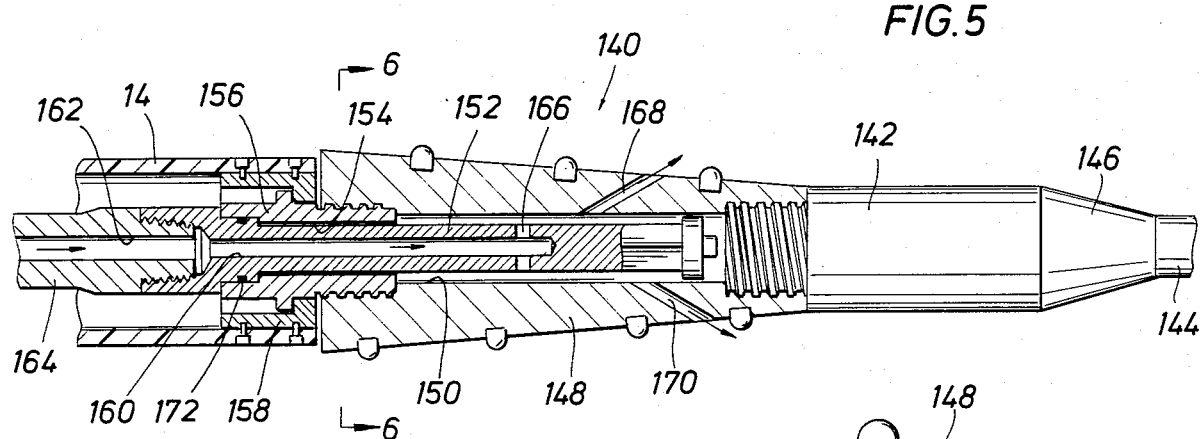
FIG.5
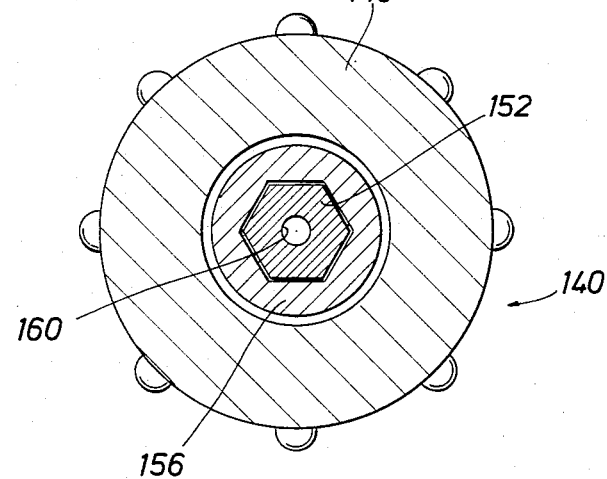
FIG.6
FIG.7
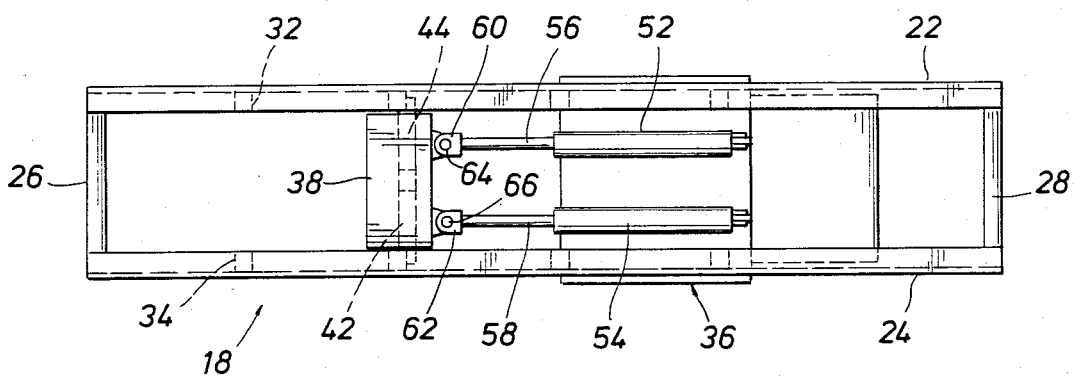
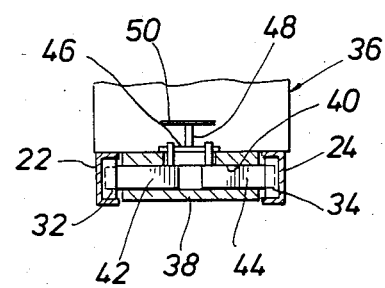
FIG.8

METHOD AND APPARATUS FOR REPLACING BURIED PIPE

FIELD OF THE INVENTION

This invention relates generally to a method and apparatus for replacement of buried pipe and more specifically concerns a method for in situ fracturing of existing buried pipe and for replacing the buried pipe with a replacement pipe of the same or larger internal diameter as compared to the buried pipe being replaced. Even more specifically, the present invention relates to apparatus that may be pushed, pulled or both pushed and pulled through existing buried pipe and which causes the buried pipe to be fractured and forces the resulting pipe fragments radially outwardly into the surrounding earth. Simultaneously, the apparatus moves a replacement pipe into the void or passage remaining as the buried pipe is traversed by a combination pipe fracturing, expansion and replacement pipe laying mandrel of the apparatus.

BACKGROUND OF THE INVENTION

Although the present invention is related to pipe replacement in general, for purposes of simplicity, the invention is discussed herein particularly as it applies to replacement of conventional sewer pipe which is employed in typical municipal environments. Typically, sewer pipe is composed of interconnected joints of pipe composed of concrete, clay tile or metal, including cast iron, steel or ductile iron. Sections of utility pipe are typically provided with enlarged bells at one end and a straight joining portion at the opposite end. Sections of utility pipe are placed in end-to-end relation with the straight portions thereof entering the enlarged bell of the adjacent pipe section. In the past, it has been considered unnecessary to establish absolutely sealed joints when utility pipes are laid. Thus, a small amount of leakage is typical. Moreover, utility pipes such as sewer pipes are seldom maintained under any pressure and therefore leakage is restricted only to a small amount of seepage at the pipe connections.

It has been found that utility pipes become deteriorated after having been buried for several years. It is now known that sewer gases cause deterioration of concrete material and also have an adverse effect on clay tile material and metal pipes. Upon deterioration of the pipe materials, the pipes can become fractured due to shifting or settling of the earth and in some cases the joints are pulled apart thereby allowing substantial leakage to occur at the pipe joints. It is desirable therefore to provide means for accomplishing replacement of utility pipes and to thereby restore the utility piping system to substantially new condition.

In many cases, the utility piping system of a municipality may have been initially established with relatively small diameter utility pipes. Additional fluid flow capacity may now be desired, such as to accommodate increased water usage or to provide for conversion of residential municipal areas to a large capacity commercial environment such as when large building structures or other commercialization is developed. To provide the additional flow capacity needed for commercial sewer systems, it is frequently necessary to replace the entire piping system with larger pipe or to install pipes in parallel relation to existing sewer systems. In such case, excavation is usually required. Sections of utility pipe are often located under roadways, sidewalks and other surface structures. Typical utility pipe replacement requires trenching to expose the pipe to be replaced which consequently requires replacement or renovation of sections of roadway, sidewalks, etc. It is desirable therefore to provide a system for replacement of utility pipes wherein surface utilities remain relatively undisturbed. In circumstances where higher volume liquid flow is required, it is desirable to provide for sewer line rehabilitation where the replacement pipe may have an internal diameter exceeding that of the pipe being replaced.

Another disadvantage of conventional municipal utility systems is that the various pipe sections there employed interfere with efficient flow of liquid. Each of the joints of the utility pipe in many cases constitute voids for deposit of sediment and create turbulence that intefers with efficient fluid flow. It is therefore desirable to provide a system for utility pipe replacement wherein the inside surface of the replacement pipe will be substantially free from surface discontinuities such as typically occur in jointed utility pipe.

It has also been determined that leakage of sewage including liquid and gaseous materials into the surface earth formation can constitute severe health hazards such as pollution of surface water and shallow underground water. Leaked sewer gases can penetrate through the surface soil and collect in the residences and building structure to such extent that a health hazard becomes present. It is also desirable to provide a utility replacement system wherein leak free replacement pipe is installed.

THE PRIOR ART

Utility line rehabilitation has long been a problem for municipalities. When a sewer line is in need of replacement or repair to prevent leakage of gas and liquid constituents, one convenient method for in-place type rehabilitation has been a process typically known as "slip lining". Slip lining is typically accomplished simply by pushing or pulling a plastic pipe through an existing sewer line. In the event the sewer line is fractured or deviates from its normal grade, slip lining becomes a difficult task. Further, since plastic pipe is inserted into existing sewer line, the logical consequence is a reduction in the inside diameter of the pipe. Under circumstances where expansion of sewer line capacity is desired, the process of slip lining is ineffective. Apparatus for slip lining type pipe rehabilitation is disclosed in a brochure relating to polyethylene pipe manufactured by Nipak, Inc., P. O. Box 2820, Dallas, Tex. 75221.

A number of mechanisms have been patented for line rehabilitation and new line installation. U.S. Pat. Nos. 4,020,641 and 4,024,721 disclose a method of laying small diameter pipes wherein a pipe passage is formed by a pilot head followed by a multi-stage head. U.S. Pat. No. 4,322,180 discloses pipe laying by an advancing jack arrangement that forces pipe through the earth formation. Pipes are also installed by pushing them through the earth as set forth in U.S. Pat. Nos. 4,297,055; 3,881,558; 4,124,082; and 3,874,463. In some cases, a pilot hole is formed and expansion means is extended through the pilot hole to extend it to desirable size. U.S. Pat. Nos. 3,482,641 and 4,249,620 exemplify such apparatus. Pipes are extended under or natural or manmade surface structures such as rivers, road beds, etc., as shown by U.S. Pat. Nos. 3,132,701; 3,656,563;

and 4,319,648. Other patents of general interest are U.S. Pat. No. 3,529,682; 4,006,521; and 4,117,895.

SUMMARY OF THE INVENTION

It is a primary feature of the present invention to provide a novel method and apparatus for sewer pipe rehabilitation wherein existing sewer pipe is fractured and expanded, thereby permitting its replacement by means of a pipe having a larger internal diameter than that of the pipe being replaced.

It is another feature of this invention to provide a novel method and apparatus for pipeline rehabilitation wherein pipe fracturing and replacement occurs in a single pass as apparatus traverses the line being replaced.

It is an even further feature of this invention to provide a novel method and apparatus for pipeline rehabilitation wherein lie replacement operations may occur under road beds, sidewalks and other surface structures without damaging them in any way.

It is also a feature of this invention to provide a novel method and apparatus for pipeline rehabilitation wherein apparatus for pipe replacement may be pushed, pulled or both pushed and pulled through the existing pipe by single pass activities, thus resulting in location of long lengths of smooth bore pipe in place of utility pipe making up the line being rehabilitated.

It is an even further feature of this invention to provide a novel method and apparatus for utility pipe rehabilitation wherein pipe rehabilitation is achieved with minimum labor and low cost.

Other and further objects, advantages and features of the present invention will become apparent to one skilled in the art upon consideration of this entire disclosure. The form of the invention which will now be described in detail illustrates the general principles of the invention, but it is to be understood that this detailed description is not to be taken as limiting the scope of the present invention.

Briefly, the novel aspects of the present invention are achieved by means of a jacking, boring and pipe replacement operation that occurs all in a single, integral process. To accomplish utility line rehabilitation, all sewer services are located and excavated. A pit is dug so that a boring and jacking machine can be positioned at to the flow line grade of the existing sewer line. An expanding head is attached to 4"-drill pipe (similar to pipe utilized in oil drilling operations). The drill pipe carries all of the load developed during jacking operations. Attached to the rear of the expanding head is a replacement pipe, which is typically formed of plastic material and is 1¼" smaller than the expanding head. The replacement pipe is mounted on a swivel secured to the expanding head and does not rotate but merely moves linearly as the expanding head is both rotated and moved linearly through the existing pipe. For efficiency of operations, the drill pipe and replacement pipe is provided in long sections (for example, 20'-sections) to thus minimize labor requirements as the replacement pipe is installed.

An engine-powered hydraulic jacking machine is employed which rotates the expanding head while simultaneously moving it linearly through the existing sewer pipe. As the expanding head is thus moved linearly and rotatably through the sewer pipe, the material from which the sewer pipe is composed is fractured and the fragments are forced radially outwardly into the surrounding earth thereby forming a passage which is of larger dimension than the internal dimension of the sewer pipe being replaced. This pipe fracturing and expansion activity forms a compacted earth arch around the replacement pipe thereby providing protection for the replacement pipe. The jacking machine is mounted on a track that is located in the pit in generally parallel relation with the grade of the existing pipe. The track forms a plurality of spaced anchor abutments which receive anchor devices that are extendable from a pusher block of the jacking machine. The jacking machine is capable of being anchored at various positions along the length of the track by the anchor means and functions to force the expanding head through the pipe being replaced by several increments of jacking movement. The cooperative relationship of the jacking machine and the track on which is moves enables long lengths of pipe to be inserted through the existing pipe by several short increments of jacking movement. After a pipe has been fully inserted, the jacking machine is released from the track, moved rearwardly to the initial jacking position thereof and new joints of drill pipe and replacement pipe are attached to again facilitate further jacking operations. In this manner, long lengths, up to 400°, of replacement pipe may be installed depending upon the characteristics of the soil in which the line being rehabilitated is buried. Depending upon soil conditions and the presence of obstacles in the line, there is a possibility of sewer line rehabilitation on the order of 100' per hour through the use of the method and apparatus of this invention.

As mentioned above, the expanding head may be forced through the earth formation by pushing operations, pulling or by both pushing and pulling. It is convenient to provide a swivel at the leading portion of the expanding head to which a towing cable may be attached. A towing cable may be connected to the power apparatus of a winch truck to thus apply a pulling force on the expanding head as it traverses the pipe being rehabilitated. This pulling force may be provided simply for the purpose of guiding the expanding head through the existing pipe so that the replacement pipe is located at accurate grade with respect to the existing pipe. The towing force thereby provides a guiding function to prevent the expanding head from deviating from the proper grade or direction as it traverses the existing pipe.

After replacement line installation has been completed in one direction, the jacking machine may be reversed on the track to thereby accomplish line rehabilitation in the opposite direction. Thus, extremely long lengths of replacement pipe may be installed from a single excavated pit. This feature also minimizes labor and expense during pipe line rehabilitation.

Various existing line materials, such as concrete, clay tile and cast iron, may be replaced in accordance with the principles set forth herein. In fact, any pipe material may be effectively replaced so long as the material is capable of being fractured by the expanding head as it traverses the line being replaced. There is no need to clear the pipe line easement of fences, trees and other surface features that have been located there during the span of years. In application, where well-pointing and trench support is necessary for replacement, the expense is held to a minimum with only points of excavation needed for this work. Where the lines are under pavement, the cost of line rehabilitation will be maintained at a minimum since the surface features will not be disturbed.

The apparatus of this invention is also capable of injecting pipe stabilizing material, such as driling mud, into the earth formation as the rehabilitated pipe is fractured and expanded. This feature further permits the development of an earth and pipe fragment arch that provides protection for the replacement pipe being installed.

BRIEF DESCRIPTION OF THE DRAWINGS

So that the manner in which the above recited features, advantages and objects of the present invention are attained and can be understood in detail, more particular description of the invention briefly summarized above, may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

Figure 1:
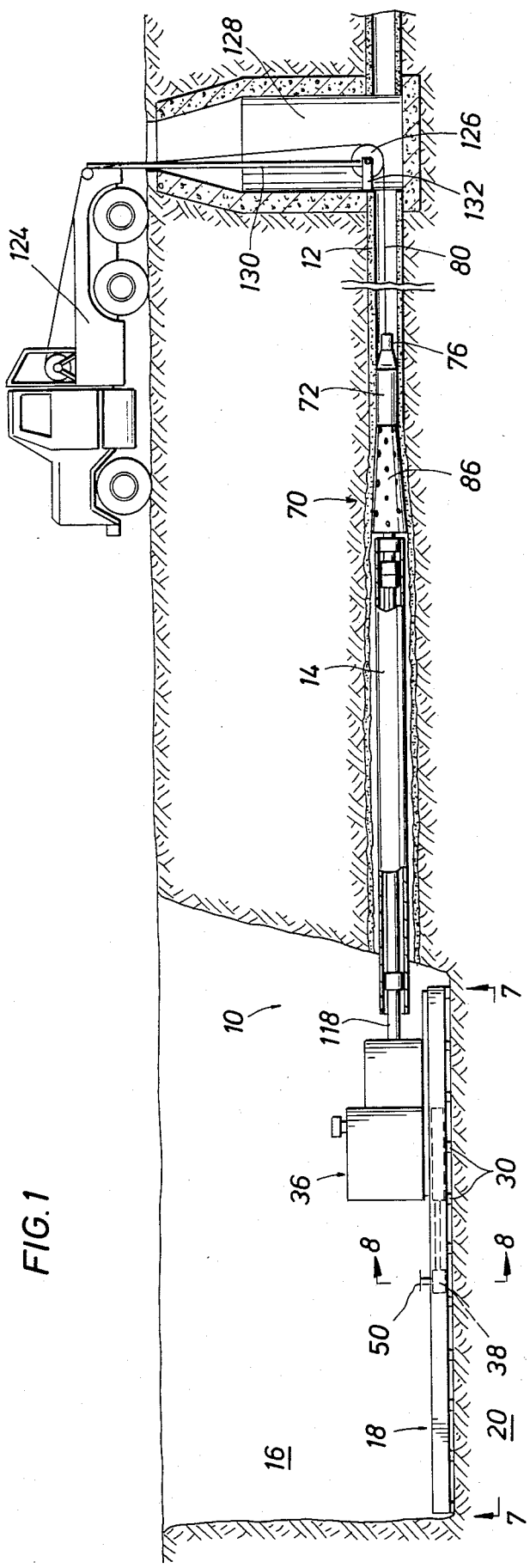

The present invention both as to its organization and manner of operation together with further objects and advantages thereof, may best be understood by way of illustration and example of certain embodiments when taken in conjunction with the accompanying drawings in which:

FIG. 1 is a sectional view of a utility pipe system buried in the earth's surface and illustrating a mechanism constructed in accordance with the present invention for replacing the utility pipe with a replacement pipe of larger dimension.

Figure 2:
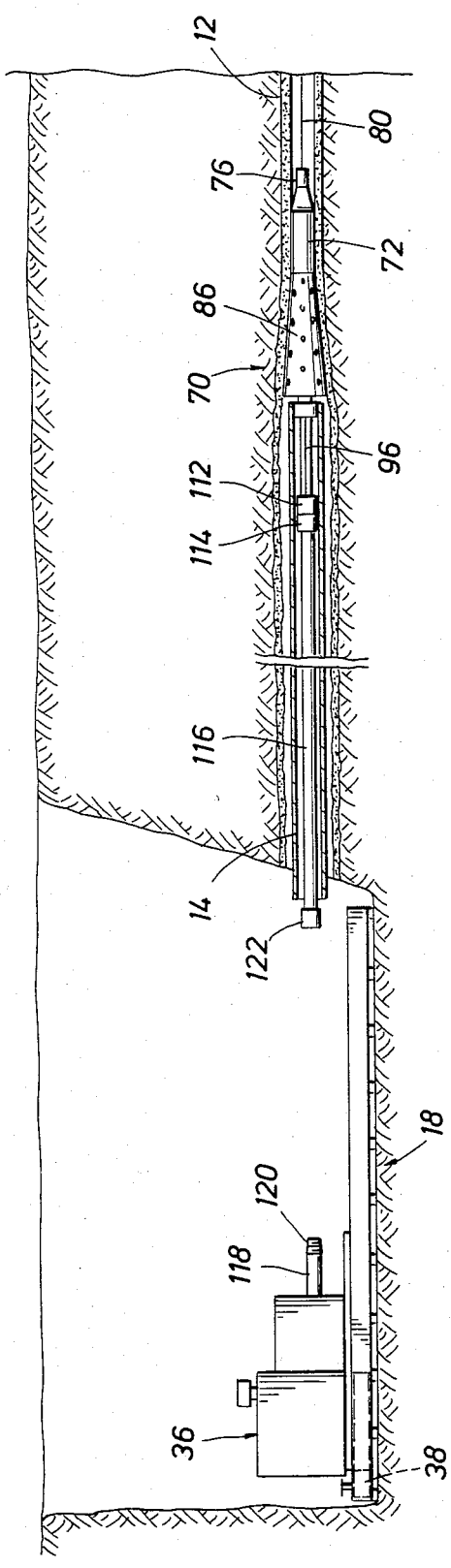

FIG. 2 is a sectional view similar to that of FIG. 1 illustrating disconnection of the jacking machine from the drill pipe and movement of the jacking machine to the rear of its track to permit connection of an additional joint of drill pipe for continuing pipe replacement operations.

FIG. 3 is a sectional view of a pipe fracturing and replacement mandrel constructed in accordance with the present invention.

FIG. 4 is a sectional view similar to that of FIG. 3 and showing movement of the drill pipe in a reverse direction while maintaining the rotational driving connection thereof with the mandrel.

FIG. 5 is a sectional view of a line expanding mandrel constructed in accordance with the present invention and representing a modified embodiment of this invention wherein soil stabilizing liquid is injected through the mandrel into the soil during line expansion operations to thus stabilize the soil about the replacement pipe.

FIG. 6 is a transverse sectional view taken along line 6—6 of FIG. 5.

FIG. 7 is a bottom view of the jacking machine support track taken along line 7—7 of FIG. 1.

FIG. 8 is a sectional view of the jacking machine support track taken along line 8—8 of FIG. 1.

Figure 9:
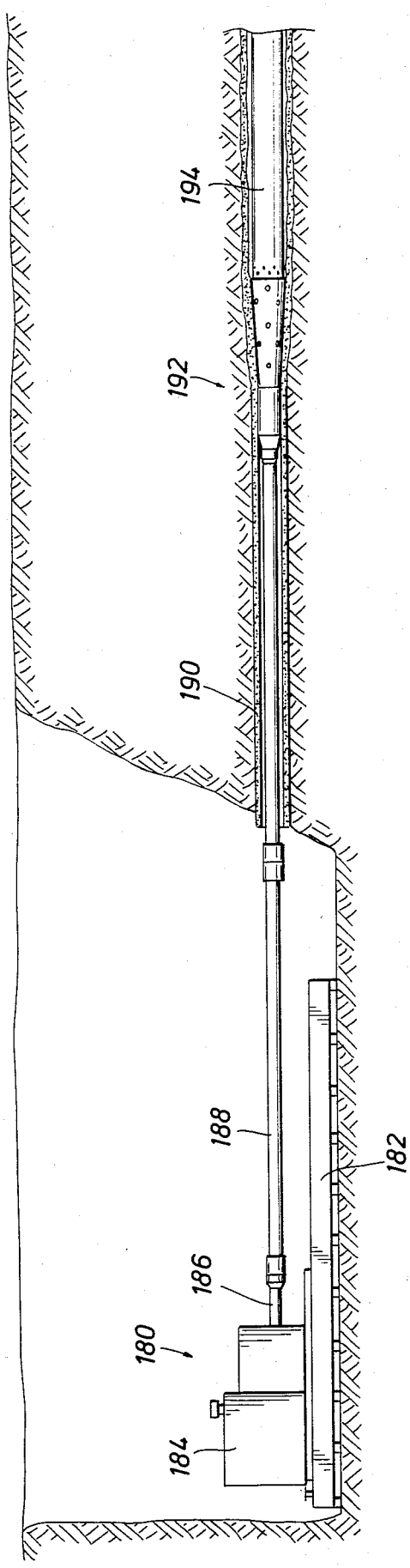

FIG. 9 is a sectional view of a portion of the earth's surface illustrating a conventional utility line in place and further illustrating a line expansion and replacement system constructed in accordance with the present invention and representing a further modified embodiment of this invention wherein the line being replaced is expanded by a mandrel system solely through application of a pulling force.

Figure 10:
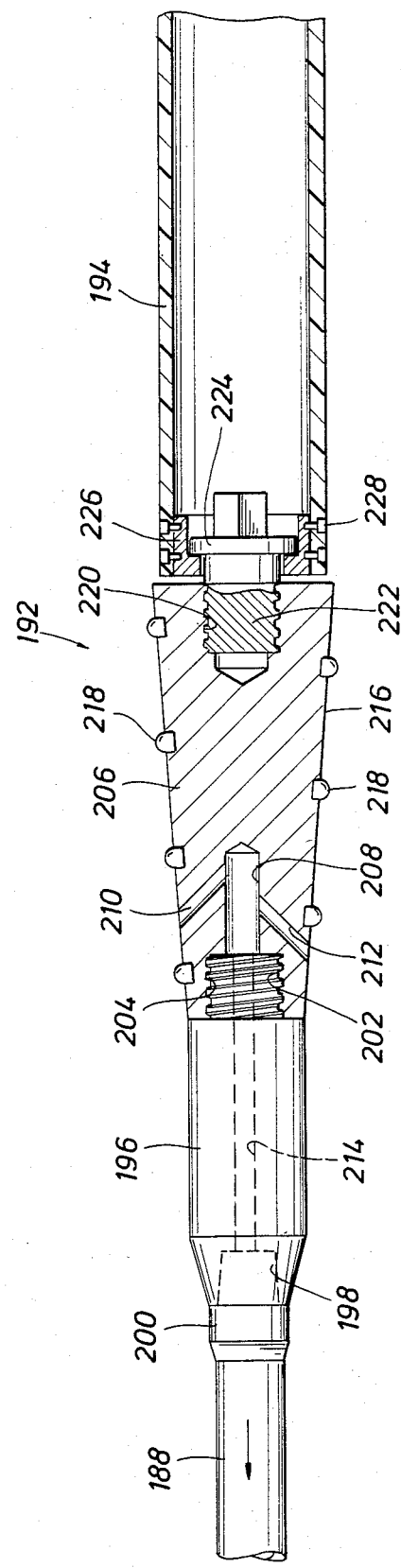

FIG. 10 is a sectional view illustrating the structural details of the line expansion and replacement mandrel of FIG. 9 and further illustrating a system for injecting soil stabilizing liquid such as drilling fluid into the earth formation surrounding the line being replaced.

DETAILED DESCRIPTION OF PREFERRED EMBODIMENT

Referring now to the drawings and first to FIGS. 1 and 2, a pictorial representation of the earth's upper surface is shown illustrating a line replacement system generally at 10 which is operative to replace a conventioal utility line 12 with a replacement line 14 which may be of smaller, the same or of larger internal dimension as compared to the dimension of the line 12 being replaced. Moreover, the line replacement system 10 is provided to accomplish line replacement without necessitating excavation and removal of the line 12 being replaced. In order to accomplish line replacement, a pit is dug as shown at 16 and a jacking machine support track shown generally at 18 is installed at the bottom of the pit in structurally secured relation to the earth 20. As shown in the bottom view of FIG. 7, the jacking machine support track comprises parallel elongated structural members 22 and 24 having transverse braces 26 and 28 interconnecting the ends of the structural members. The support track 18 may also incorporate a plurality of intermediate structure members if desired to enhance the structural integrity thereof. As shown in FIG. 1, a plurality of transverse support members 30 are located at the bottom of the pit in order to support the track 18 in substantially parallel relation with the grade of the pipe 12 being replaced. Intermediate abutment members are arranged in substantially equally spaced pairs along the length of the structural members 22 and 24, one abutment pair being shown at 32 and 34 in FIGS. 7 and 8.

A jacking machine is illustrated generally at 36 in FIG. 1 which is movably supported on the track 18. The jacking machine includes a pusher block 38 which is disposed between the structural members 22 and 24 and which defines an internal transverse passage 40 receiving a pair of transversely movable locking members 42 and 44. A lock operating mechanism is shown at 46 having an operating shaft 48 and handle 50 as shown in FIG. 8 enabling the locking mechanism to be manually manipulated thereby moving the locking elements 42 and 44 to the retracted and extended positions thereof. As shown in FIG. 8, the locking elements 42 and 44 are extended such that the outer extremities thereof are disposed for force transmitting engagement with the respective abutment members 32 and 34. The pusher block is thereby adapted to be maintained in static, force transmitting engagement with the abutment members thereby transmitting pushing forces from the jacking machine 36 to the track 18.

A pair of hydraulic pusher cylinders 52 and 54 are secured to the lower portion of the jacking machine 36 and include internal pistons that impart linear movement to respective drive shafts 56 and 58. Clevis members 60 and 62 are secured at the extremities of the drive shafts and are connected by pins 64 and 66 to drive projections that extend from the pusher block 38. As the hydraulic cylinders 52 and 54 are simultaneously energized by means of a hydraulic system driven by an engine contained within the jacking mechanism 36, the drive shafts 56 and 58 will be extended with the locking elements 42 and 44 in engaging relation with the track abutment members 32 and 34. When this occurs, the jacking machine 36 is propelled in a forward direction to impart thrust forces to a pipe expansion and replacement mandrel to be discussed hereinbelow. After the drive shafts 56 and 58 of the cylinders have been driven to the maximum extent thereof (for example, 30" or so, depending upon the design characteristics of the mechanism), the hydraulic cylinders will be deenergized. The locking members 42 and 44 will then be retracted by the mechanism 46. Thereafter, the hydraulic cylinders will be reversed, driving the shafts 56 and 58 in the opposite direction, thus moving the pusher block 38 toward the jacking mechanism 36. After the drive shafts 56 and 58 have been fully retracted, the pusher block 38 will be in the position shown in FIG. 2. The lock actuating mechanism 46 then will be again manipulated to shift the locking elements 42 and 44 to the extended positions thereof as shown in FIG. 8 for engagement with another opposed pair of abutment members 32 and 34. The jacking machine therefore has the capability of moving incrementally along the track 18 and to thus drive the pipe expanding and replacement mandrel incrementally through the pipe being replaced.

Referring now to FIGS. 3 and 4, the pipe expansion and replacement mandrel is shown generally at 70 with a section of replacement pipe 14 secured thereto. The mandrel 70 is of elongated form having a front guide portion 72 which includes a generally conical nose portion 74 and a swivel type traction projection 76. A connector passage 78 is formed in the traction projection and provides for connection of a traction cable 80 thereto in the manner shown in FIG. 1. If desired, the guide portion 72 may be of soild, integral form, machined from a single section of bar stock. The swivel 76 includes thrust bearings of any suitable form. At the rear portion of the guide section, an externally threaded projection 82 is provided which is received by internal threads 84 formed in an elongated tapered pipe expansion section 86. The pipe expansion section is of generally conical configuration tapering from a small dimension at 88 which is of smaller dimension or corresponding dimension as compared to the inner dimension of the pipe 12 being replaced. The conical pipe expansion section 86 tapers to a large dimension 90 at its opposite extremity which is typically of greater diameter as compared to the internal diameter of the pipe 12 being replaced. In fact, the large dimension 90 may be substantially larger than the internal and external dimension of the pipe being replaced if desired. A number of hard metal boring buttons 92 are embedded within the conical surface of the pipe expansion section 86 and project therefrom to a desired extent. The buttons 92 are composed of any suitable hard material such as tungsten carbide, for example, and function to engage the internal surface of the pipe being replaced and to cause a scoring or boring activity as the pipe expansion section is moved linearly and rotatably through the pipe. This boring activity assists in accomplishing fracturing of the pipe being replaced whether the pipe be composed of concrete, clay tile, cast iron, etc. The pipe expansion section 86 defines an internal passage or receptacle 94 which receives an elongated non-circular drive element 96 in telescoping relation therein. The pipe expansion section also defines internal threads 98 at the opposite extremity thereof of which receive the externally threaded portion 100 of a combination thrust transmitting and swivel support member 102. Member 102 defines an intermediate support flange 104 which functions as a retainer flange for a swivel member 106. The swivel member is adapted to receive a plurality of attachment bolts 108 which secure one extremity of the replacement pipe 14 to the swivel element.

The thrust transmitting and swivel support member also provides the function of imparting rotation to the pipe expansion and guide sections of the mandrel. Member 102 is formed internally to define a non-circular drive opening 110 which receives the non-circular drive element or kelly 96 in non-rotatable but linearly movable relation. The drive element 96 defines a conventional internally threaded box connection 112 at one extremity thereof which is adapted to receive the externally threaded pin connection 114 of a section of drill pipe 116 which may be of the same general nature as the drill pipe utilized for well drilling operations for petroleum products. At its opposite extremity the drive member 96 is provided with an enlarged abutment member 118 which is secured thereto by means of a bolt 120. The enlarged head 118 is adapted to engage a stop shoulder 122 defined at one end of member 102 to thus prevent the drive member 96 from being separated from its connection with the member 102. The drive member thus has a lost-motion connection with the mandrel and is movable between limits permitted by the box connection 112 and enlarged head 118. FIG. 4 illustrates the lost-motion connection moved to the maximum extent of its movement in the direction shown by the force arrow. FIG. 3 illustrates thrust forces being applied through the drill pipe 116 to the mandrel 70.

Referring now again to FIGS. 1 and 2, the jacking machine 36 is provided with a rotatable drive member 118 having a conventional externally threaded pin connection 120 which is adapted to be received by the internally threaded box connection 122 of the drill pipe 116. As the jacking machine is moved forwardly through energization of the hydraulic cylinders 52 and 54, a forward thrust force will be applied through the drill pipe 116 to the pin connection 112 and thence to the thrust transmitting member 102 to the pipe expansion section 86. The pipe expansion section is thus driven by this thrust force through the pipe 12 being replaced. Although such is not intended to be limiting as regards the spirit and scope of the present invention, thrust forces in the order of 160,000 lbs. to 300,000 lbs. can be transmitted by the jacking machine 36 to the pipe expansion section 86. A winch truck 124 or other suitable cable winching mechanism may be employed as shown in FIG. 1 for application of a pulling force to the cable 80 through the swivel element 76 of the mandrel. This pulling force may be applied solely for the purpose of achieving guidance of the nose portion of the mandrel or, in the alternative, such pulling force may also assist in movement of the mandrel through the pipe being replaced. As shown in FIG. 1, a pulley 126 is located at the lower portion of a utility access pit 128 by means of an elongated pulley support member 130. The pulley incorporates a thrust member 132 which bears against a wall of the pit 128 and thus functions to restrain movement of the pulley as a pulling force is applied to the cable 80 by the winch system of the truck 124. When the pulling force is utilized solely for the purpose of ensuring accurate tracking of the mandrel through the pipe being replaced, the pulling force may be in the order of 5,000 lbs. more or less. This particular pulling force, however, is not intended to be limiting of the present invention, it being obvious that the pulling force is determined by the design characteristics to be accomplished.

Referring now again to FIGS. 1 and 2, the jacking machine 36 is shown in FIG. 1 in its full forward position, after having driven the mandrel 70 through the pipe 12 to the maximum extent allowed by the length of the drill pipe 116. As shown in FIG. 2, the rotatable drive element 117 of the jacking machine has been disconnected from the box connection 122 of the drill pipe and the jacking machine has been moved rearwardly to its maximum extent on the track 18. Thereafter, another section of replacement pipe will be secured to the replacement pipe 14 and another section of drill pipe will be interposed between the drill pipe section 116 and the rotatable drive portion 118 of the jacking machine. Typically, a section of plastic replacement pipe with a section of drill pipe inside will be positioned in the pit in general alignment with the grade and direction of the existing utility pipe. The plastic pipe will then be bonded to the adjacent plastic pipe section. The drill pipe section will then be threaded to the adjacent drill pipe section, connected to the drive element 117 of the machine. Jacking and simultaneous pipe rotation operations will then continue in the manner described above thereby inducing simultaneous rotation and linear movement to the mandrel 70 to continue its passage through the existing pipe 12. Continued pipe rehabilitation operations may occur in the same manner with as many sections of drill pipe and replacement pipe being added as is necessary to force the mandrel 70 through a desired length of the original pipe 12. It has been determined, depending upon soil conditions, pipe size and other limiting factors, that sections of replacement pipe in the order of 400' in length may be installed in accordance with the teachings of the invention. In accordance with the utility design characteristics set forth in FIG. 1, pipe rehabilitation pits such as shown at 16 may be located at 400' intervals on either side of the utility access pit 128, thereby providing for efficient pipe rehabilitation in the order of 800' in length between the pipe rehabilitation pits. Moreover, such pipe rehabilitation may be accomplished beneath roadways, sidewalks, and through utility easements without disturbing the surface features thereof.

As mentioned above, at times it is desirable to accomplish replacement of a utility piping system with a replacement piping system of larger fluid carrying capacity. It is also desirable to provide a replacement piping system having smooth internal wall surfaces to thereby eliminate internal fluid turbulence and thereby permit more efficient flow through the utility system. These features may be effectively accomplished in accordance with the teachings of the present invention. For installation of a replacement pipeline of larger dimension than the original utility line 12, the large dimension 90 of the pipe expansion section 86 may simply be of significantly large diameter than the internal diameter of the original pipe. As the mandrel 70 is forced through the original pipe, the combined effects of thrust force applied by the jacking machine through the drill pipe to the mandrel and rotation of the mandrel causes the original pipe to be fractured into many fragments. This fracturing effect is enhanced by internal scoring of the original pipe which occurs as the carbide buttons 92 are both rotated and driven linearly within the original pipe. As the pipe is fractured, the outer tapered surface 87 of the pipe expansion section functions in camming relation with the pipe fragments thereby forcing them radially outwardly into the earth surrounding the original pipe. When this occurs, the earth surrounding the pipe is compacted, thereby providing a consolidated earth arch around the replacement pipe 14. This earth arch is strengthened by the pipe fragments that are forced into it by the camming activity of the mandrel.

It may also be desirable to inject a stabilizing liquid such as conventional well drilling fluid into the earth during pipe expansion operations to thus enhance consolidation of the earth about the replacement pipe. Further, a fluid may be injected through the mandrel for the purpose of providing a lubrication quality to thus minimize force requirements as the mandrel is being forced linearly and rotatably through the pipe. Accordingly, a modified embodiment of the invention may take the form illustrated in FIGS. 5 and 6 where a mandrel structure illustrated generally at 140 is shown. The mandrel 140 incorporates a guide portion 142 having a swivel element 144 connected to the tapered nose portion 146 thereof. The guide portion may be connected by threads in similar manner to a tapered pipe expansion section 148 defining an internal receptacle 150 which receives an elongated non-circular drive element 152. The drive element 152 extends through a non-circular mating opening 154 of a combination thrust and torque transmitting element 156 which also provides support for a replacement pipe swivel 158. The elongated non-circular drive element 152 defines an internal axial flow passage 160 which is in communication with a flow passage 162 of drill pipe 164. Passage 160 is intersected by a transverse passage 166 which permits fluid from passage 160 to flow into the receptacle 150 of the pipe expansion section 148. Directionally oriented injection passages 168 and 170 are formed in the pipe expansion section 148 and communicate with the receptacle 150. Drilling fluid or other suitable soil consolidation and lubrication fluid will flow from the receptacle 150 through injection passages 168 and 170. As the mandrel is rotated through rotation of the drill pipe 164, the fluid being ejected from passages 168 and 170 will be evenly distributed in the soil through the fractures formed in the pipe being replaced. This fluid will thereby consolidate the soil, further enhancing the compacted soil arch that is formed as the mandrel is forced through the pipe. The injected fluid will also function to reduce friction and permit ease of installation. An internal seal member is provided as shown at 172 for the purpose of containing the fluid within the receptacle 150 and thereby ensuring that the fluid is ejected through the angulated passages 168 and 170.

It may be desirable to accomplish pipe rehabilitation operations solely through application of a pulling force rather than through application of a pushing force or combination pushing and pulling forces. Accordingly, a pipe rehabilitation mechanism may take the form illustrated generally at 180 in FIG. 9 wherein a track 182 is employed which is similar in construction and function to the track 18 of FIGS. 1, 2 and 7. A machine may be provided as shown at 184 having a rotational drive mechanism imparting rotation to a drive member 186 which is capable of threaded connection to a section of drill pipe 188. The machine 184 may incorporate a similar jacking mechanism having a pulling block similar to that shown at 138 and hydraulic cylinders similar to those shown at 52 and 54 in FIG. 7. The machine 184 therefore imparts rotation to the drill pipe 188 simultaneously with imparting pulling movement to the drill pipe moving it in a direction away from the pipe 190 being replaced.

A mandrel illustrated generally at 192 in FIG. 9 and shown in greater detail in FIG. 10, is adapted to be pulled through the pipe 190 causing fracturing of the pipe and forcing the fractured fragments radially outwardly into the earth surrounding the pipe thereby consolidating the earth and forming a passage for a replacement pipe 194 which may be of greater diameter as compared to the diameter of the pipe being replaced. The mandrel 192 incorporates a connector section 196 having an internally threaded box connection 198 adapted to receive the standard externally threaded pin connection 200 of the drill pipe 188. The connector section 196 is secured by an externally threaded projection 202 to the internal threads 204 of a tapered pipe expansion section 206. The pipe expansion section may, if desired, be formed to define an internal fluid passage 208 conducting soil consolidating and lubricating fluid to injection passages 210 and 212. The passage 208 will be in comminication with an internal flow passage 214 formed through the connection section 196. Fluid such as conventional well drilling fluid will be pumped through the drill pipe 188 to the injection passages 210 and 212 through the flow passages 208 and 214. The pipe expansion section 206 defines a generally conical tapered surface 216 having a plurality of hardened boring buttons 218 embedded therein to provide for internal pipe scoring and boring as the mandrel 192 is moved linearly and rotatably to traverse the pipe being replaced.

For the provision of a pipe replacement function, the tapered pipe expansion section 206 of the mandrel defines an internally threaded opening 220 which is adapted to receive an externally threaded connector element 222 having a swivel support flange 224 provided thereon. The support flange 224 receives a swivel element 226 to which the replacement pipe 194 is connected by means of bolts 228.

Utilization of the apparatus 180 shown in FIGS. 9 and 10 is accomplished by first extending connected sections of drill pipe 188 through the pipe 190 to be replaced. After the drill pipe has been extended through the buried pipe, the mandrel 192 will be attached to the pin connection 200 at the free extremity thereof. The jacking machine 184 will then be located at the right side portion of the track as shown in FIG. 9 and a length of replacement pipe 194 will be secured by the bolts 228 to the swivel 226. The machine 184 will then be energized to accomplish rotation of the drive member 186 thereby rotating the drill pipe 188. Simultaneously, the hydraulic cylinders of the machine will be energized thereby driving the machine to the left to thereby impart a pulling force through the drill pipe 188 to the mandrel 192. The mandrel 192 is thereby simultaneously moved linearly through the pipe being replaced and is moved rotatably to thereby cause the boring buttons 218 to score the internal surface of the pipe during linear and rotatable movement. Because the replacement pipe 194 is connected to the mandrel by means of a swivel connection it will not rotate and will be simply moved linearly into the passage that is formed as the pipe fragments are forced radially outwardly by the camming activity of surface 216. This camming activity forces the fragments of the broken pipe into the earth and thereby functions to compact the earth and form a consolidated earth arch about the replacement pipe. In the event a fluid substance such as drilling mud is desired for further consolidation of the soil or for the purpose of lubrication, it is injected through the drill pipe and is ejected into the soil through passages 210 and 212.

If desired, the mandrels 70, 140 and 192 may be moved linearly without simultaneous rotation to accomplish line rehabilitation operations.

In view of the foregoing, it is evident that the present invention is one well adapted to attain all of the objects and features hereinabove set forth, together with other objects and features that are inherent from the method and apparatus described hereinabove.

What is claimed is:

1. A method of replacing buried nonmetal tile pipe with replacement pipe having an internal diameter that may exceed the internal diameter of the existing buried tile pipe comprising:
   (a) locating pipe fracturing and replacement apparatus in axial registry with the centerline of the pipe to be replaced, said pipe fracturing and replacement apparatus having a pipe fracturing mandrel of generally frusto-conical configuration and having a diameter at its leading extremity not greater than the internal diameter of said buried nonmetal tile pipe and a diameter at its trailing extremity which is greater than the outer diameter of said replacement pipe;
   (b) simultaneously forcing said pipe fracturing mandrel through said buried tile pipe, reducing the pipe to be replaced to a fractured form having a multitude of pipe fragments of irregular form and
   forcing each of the pipe fragments of the fractured tile pipe radially outwardly into the surrounding earth formation thus forming a replacement pipe passage of a dimension exceeding the external dimension of the replacement pipe; and
   (c) extending a replacement pipe into the passage simultaneously with passage of said pipe fracturing mandrel through said buried nonmetal tile pipe.

2. A method as recited in claim 1, wherein:
said method steps of paragraphs (b) and (c) are accomplished in a single pass with said pipe fracturing and replacement apparatus.

3. A method as recited in claim 1, wherein:
said pipe fracturing mandrel is forcibly moved through the buried nonmetal tile pipe by simultaneous linear and rotational components of movement.

4. A method as recited in claim 1, wherein:
said pipe fracturing mandrel is moved through said pipe by a pushing force.

5. A method as recited in claim 1, wherein:
said pipe fracturing mandrel is moved through said pipe by a pulling force.

6. A method as recited in claim 1, wherein:
said pipe fracturing mandrel is moved through said pipe by both pushing and pulling forces.

7. Apparatus for fracturing and expanding buried fracturable tile pipe and positioning a replacement pipe with its centerline substantially coincident with said buried fracturable tile pipe, comprising:
   (a) an elongated pipe fracturing and displacement mandrel having a generally frusto-conical pipe fracturing and expanding portion having a small extremity not greater than the internal diameter of said buried fracturable tile pipe and a large extremity exceeding the external dimension of said replacement pipe, said pipe fracturing and expanding portion, upon being forced through said buried fracturable tile pipe, reducing said buried fracturable title pipe to a multitude of pipe fragments of irregular form and forcing said pipe fragments radially outwardly into the soil within which said fracturable tile pipe is buried;
(b) means for moving said pipe fraacturing and displacement mandrel through said buried fracturable tile pipe;
(c) connector means mounted on said mandrel at the trailing portion of said pipe fracturing and expanding portion, said connector means adapted for connection to the leading end of said replacement pipe whereby said replacement pipe is moved linearly into the passage occupied by said buried fracturable tile pipe before fracturing and expansion thereof.

8. Apparatus as recited in claim 7, wherein:
said means for moving said pipe fracturing and displacement mandrel through said buried fracturable tile pipe comprises means for applying a pushing force to said pipe fracturing and displacement mandrel.

9. Apparatus as recited in claim 7, wherein:
said means for moving said pipe fracturing and displacement mandrel through said buried fracturable tile pipe comprises means for applying a pulling force to said mandrel.

10. Apparatus as recited in claim 7, wherein:
said means for moving said pipe fracturing and displacement mandrel through said buried fracturable tile pipe comprises means for applying simultaneous pushing and pulling forces to said pipe fracturing and displacement mandrel.

11. Apparatus as recited in claim 7, wherein:
said means for moving said pipe fracturing and displacement mandrel through said pipe induces simultaneous linear and rotary movement to said pipe fracturing and displacement mandrel.

12. Apparatus as recited in claim 1, wherein:
a plurality of hard boring projections are embedded within said pipe fracturing and expanding portion, said hard projections extending radially outwardly from said pipe fracturing and expanding portion for scoring engagement with the internal surface of said buried fracturable tile pipe.

13. Apparatus as recited in claim 7 wherein said means for moving said mandrel through said pipe comprises:
(a) elongated support track means adapted for location in substantially parallel relation with the grade of said buried fracturable tile pipe, said track means defining spaced abutment means;
(b) jacking means being suported by said track means and having force transmitting relation with said abutment means; and
(c) elongated rigid force transmitting means interconnecting said jacking means and said pipe fracturing and displacement mandrel.

14. Apparatus as recited in claim 13, wherein said jacking machine comprises:
(a) a power system driven by engine means, said power system imparting rotary movement to said rigid force transmitting means and said pipe fracturing and displacement mandrel;
(b) block means having abutment engagement means; and
(c) linear hydraulic motor means interconnecting said power system and said block means and, when energized, imparting linear movement to said power system relative to said track means and thus imparting linear movement to said rigid force transmitting means and said pipe fracturing and displacement mandrel.

15. Apparatus as recited in claim 14, wherein:
said linear hydraulic motor means imparts a pushing movement to said block means to move said power system relative to said track means.

16. Apparatus as recited in claim 14, wherein:
said hydraulic motor means imparts a pulling movement to said block means to move said power system relative to said track means.

17. Apparatus as recited in claim 13, wherein:
said elongated rigid force transmitting means is defined by elongated pushing bar means adapted to extend through said replacement pipe and being releasably connected to said pipe fracturing and displacement mandrel.

18. A method of replacing buried nonmetal fracturable tile pipe with a replacement pipe having an internal diameter equal to or greater than the internal diameter of the buried nonmetal fracturable tile pipe, comprising:
(a) fracturing said buried nonmetal fracturable tile pipe in situ and forming a multitude of pipe fragments of irregular form;
(b) moving each of said pipe fragments in a direction radially of the centerline of said buried nonmetal fracturable tile pipe and embedding said multitude of pipe fragments into the soil within which said tile pipe is buried thus forming a replacement pipe passage of soil and pipe fragments having a common centerline with said buried fracturable tile pipe and a diameter exceeding the outer diameter of said replacement pipe; and
(c) moving said replcement pipe endwise into said replacement pipe passage simultaneously with said fracturing of said buried fracturable tile pipe and said radial movement of said multitude of pipe fragments.

19. Apparatus as recited in claim 13, wherein:
said elongated rigid force transmitting means comprises:
(a) sections of elongated pusher bar being connectable end-to-end being capable of transmitting predetermined pushing force to said pipe fracturing and replacement apparatus; and
(b) said jacking means facilitating incremental pushing movement of said sections of elongated pusher bar and connection of additional sections of elongated pusher bar and replacement pipe for replacement of a desired length of buried fracturable tile pipe.

* * * * *

REEXAMINATION CERTIFICATE (794th)
United States Patent [19]
[11] B1 4,507,019

Thompson

[45] Certificate Issued Dec. 8, 1987

[54] METHOD AND APPARATUS FOR REPLACING BURIED PIPE

[75] Inventor: Alan E. Thompson, Kilgore, Tex.

[73] Assignee: Expand-A-Line, Incorporated, Pasadena, Tex.

Reexamination Request:
No. 90/001,085, Sep. 11, 1986

Reexamination Certificate for:
Patent No.: 4,507,019
Issued: Mar. 26, 1985
Appl. No.: 468,137
Filed: Feb. 22, 1983

[51] Int. Cl.$^4$ .................. F16L 1/00; F16L 55/18
[52] U.S. Cl. ........................... 405/154; 138/97; 166/55.2; 166/55.3; 175/22; 405/184; 30/92.5; 225/103
[58] Field of Search ............. 405/154, 156, 184; 83/178; 173/132, 133; 138/97; 30/92.5; 225/103; 29/234-236, 255; 166/55.2, 55.3

[56] References Cited
U.S. PATENT DOCUMENTS

| | | | |
|---|---|---|---|
| 2,163,384 | 6/1939 | Stevens | 15/104.07 |
| 4,117,895 | 10/1978 | Ward et al. | 405/184 X |
| 4,505,302 | 3/1985 | Streatfield et al. | 405/184 X |

*Primary Examiner*—Dennis L. Taylor

[57] ABSTRACT

A pipeline replacement system incorporating an expansion and line replacement mandrel and having a power system for imparting linear movement and rotation to the mandrel. Within the scope of the invention, the mandrel may be pushed or pulled or both pushed and pulled through an existing buried pipeline by the power system while being rotated by the power system. The mechanism, in a single pass, breaks up the existing pipeline, forces the broken fragments of the pipeline into the surrounding earth and positions a replacement pipe of the same dimension or larger dimension in place of the existing pipeline. A swivel system allows the replacement pipe to be moved linearly into the expanded passage behind the mandrel without rotation. The power system includes a mechanism or mechanisms for applying pushing, rotational and pulling forces to the mandrel.

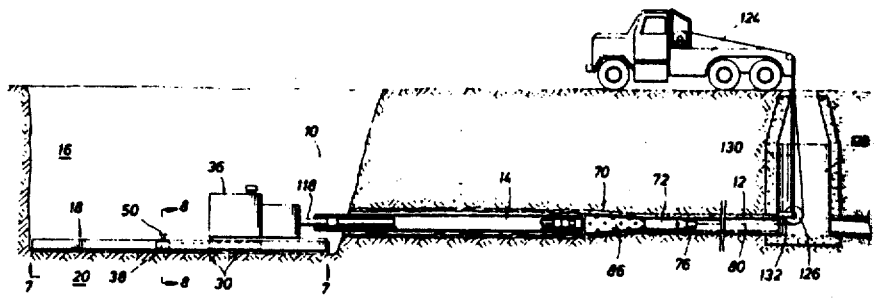

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7–10, 13, 18 and 19 are determined to be patentable as amended.

Claims 2, 4–6, 12 and 14–17, dependent on an amended claim, are determined to be patentable.

New claims 3 and 11 are added and determined to be patentable.

1. A method of replacing buried nonmetal tile pipe with replacement pipe having an internal diameter that may exceed the internal diameter of the existing buried fracturable tile pipe comprising:
   (a) locating pipe fracturing and replacement apparatus in axial registry with the centerline of the pipe to be replaced, said pipe fracturing and replacement apparatus having a pipe fracturing mandrel of generally frusto-conical configuration and having a diameter at its leading extremity not greater than the internal diameter of said buried nonmetal tile pipe and a diameter at its trailing extremity which is greater than the outer diameter of said replacement pipe;
   (b) simultaneously forcing said pipe fracturing mandrel through said buried tile fracturable pipe *by simultaneous linear and rotary components of movement*, reducing the pipe to be replaced to a fractured form having a multitude of pipe fragments of irregular form and forcing each of the pipe fragments of the fractured tile pipe radially outwardly into the surrounding earth formation thus forming a replacement pipe passage of a dimension exceeding the external dimension of the replacement pipe; and
   (c) extending a replacement pipe into [the] *said replacement pipe* passage simultaneously with passage of said pipe fracturing mandrel through said buried nonmetal tile pipe.

7. Apparatus for fracturing and expanding buried fracturable tile pipe and positioning a replacement pipe with its centerline substantially coincident with said buried fracturable tile pipe, comprising:
   (a) an elongated pipe fracturing and displacement mandrel having a generally frusto-conical pipe fracturing and expanding portion having a small extremity not greater than the internal diameter of said buried fracturable tile pipe and a large extremity exceeding the external dimension of said replacement pipe, said pipe fracturing and expanding portion, upon being forced through said buried fracturable tile pipe, reducing said buried fracturable tile pipe to a multitude of pipe fragments of irregular form and forcing said pipe fragments radially outwardly into the soil within which said fracturable tile pipe is buried;
   (b) means for moving said pipe [fraacturing] *fracturing* and displacement mandrel through said buried fracturable tile pipe *with simultaneous linear and rotary components of movement;*
   (c) connector means mounted on said mandrel at the trailing portion of said pipe fracturing and expanding portion, said connector means adapted for connection to the leading end of said replacement pipe whereby said replacement pipe is moved linearly into the passage occupied by said buried fracturable tile pipe before fracturing and expansion thereof.

8. Apparatus as recited in claim 7, wherein:
said means for moving said pipe fracturing and displacement mandrel through said buried fracturable tile pipe comprises means for applying a pushing *and rotating* force to said pipe fracturing and displacement mandrel.

9. Apparatus as recited in claim 7, wherein:
said means for moving said pipe fracturing and displacement mandrel through said buried fracturable tile pipe comprises means for applying *a rotating force and* a pulling force to said mandrel.

10. Apparatus as recited in claim 7, wherein:
said means for moving said pipe fracturing and displacement mandrel through said buried fracturable tile pipe comprises means for applying simultaneous pushing, *rotating* and pulling forces to said pipe fracturing and displacement mandrel.

13. Apparatus as recited in claim 7 wherein said means for moving said mandrel through said pipe comprises:
   (a) elongated support track means adapted for location in substantially parallel relation with the grade of said buried fracturable tile pipe, said track means defining spaced abutment means;
   (b) jacking means being [suported] *supported* by said track means and having force transmitting relation with said abutment means; and
   (c) elongated rigid force transmitting means interconnecting said jacking means and said pipe fracturing and displacement mandrel.

18. A method of replacing buried nonmetal fracturable tile pipe with a replacement pipe having an internal diameter equal to or greater than the internal diameter of the buried nonmetal fracturable tile pipe, comprising:
   (a) *forcing a tapered mandrel through said buried fracturable tile pipe with simultaneous components of linear and rotary movement of said tapered mandrel for* fracturing said buried nonmetal fracturable tile pipe in situ and forming a multitude of pipe fragments of irregular form;
   (b) moving each of said pipe fragments in a direction radially of the centerline of said buried [nonmetal] fracturable tile pipe and embedding said multitude of pipe fragments into the soil within which said *fracturable* tile pipe is buried thus forming a replacement pipe passage of soil and pipe fragments having a common centerline with said buried fracturable tile pipe and a diameter exceeding the outer diameter of said replacement pipe; and
   (c) moving said [replcement] *replacement* pipe endwise into said replacement pipe passage simultaneously with said fracturing of said buried fracturable tile pipe and said radial movement of said multitude of pipe fragments.

19. Apparatus as recited in claim 13, wherein said ongated rigid force transmitting means comprises:
(a) sections of elongated pusher bar being connectable end-to-end being capable of transmitting predetermined pushing force to said pipe fracturing and replacement apparatus *mandrel,* and [;]:
(b) said jacking means facilitating incremental pushing movement of said sections of elongated pusher bar and connection of additional sections of elongated pusher bar and replacement pipe for replacement of a desired length of buried fracturable tile pipe.

* * * * *